United States Patent
Wu et al.

(10) Patent No.: US 10,488,961 B2
(45) Date of Patent: Nov. 26, 2019

(54) GATE DRIVING CIRCUIT FOR DRIVING A PIXEL ARRAY HAVING A TRIGGER CIRCUIT FOR RECEIVING A TOUCH SENSING SIGNAL

(71) Applicant: InnoLux Corporation, Miao-Li County (TW)

(72) Inventors: Chun-Fu Wu, Miao-Li County (TW); Wen-Tsai Hsu, Miao-Li County (TW); Chien-Hsueh Chiang, Miao-Li County (TW); Wei-Kuang Lien, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 230 days.

(21) Appl. No.: 15/211,996

(22) Filed: Jul. 15, 2016

(65) Prior Publication Data
US 2017/0017326 A1    Jan. 19, 2017

Related U.S. Application Data

(60) Provisional application No. 62/202,570, filed on Aug. 7, 2015, provisional application No. 62/193,787, filed on Jul. 17, 2015.

(30) Foreign Application Priority Data

Dec. 30, 2015 (TW) .............................. 104144407 A

(51) Int. Cl.
*G06F 3/041* (2006.01)
*G09G 3/20* (2006.01)
*G09G 3/36* (2006.01)

(52) U.S. Cl.
CPC .......... *G06F 3/0412* (2013.01); *G06F 3/0416* (2013.01); *G09G 3/2096* (2013.01);
(Continued)

(58) Field of Classification Search
CPC ... G06F 3/0412; G06F 3/0416; G09G 3/2096; G09G 3/3677; G09G 2310/0267; G09G 2310/0286; G09G 2310/08
See application file for complete search history.

(56) References Cited

U.S. PATENT DOCUMENTS

2014/0055411 A1* 2/2014 Zhao ..................... G06F 3/044
345/174
2015/0255014 A1* 9/2015 Lin ......................... G11C 19/28
345/84

(Continued)

FOREIGN PATENT DOCUMENTS

| CN | 104021769 A | 9/2014 |
| CN | 104318885 A | 1/2015 |

*Primary Examiner* — Temesghen Ghebretinsae
*Assistant Examiner* — Ivelisse Martinez Quiles
(74) *Attorney, Agent, or Firm* — McClure, Qualey & Rodack, LLP

(57) ABSTRACT

The invention provides a gate driving circuit for an in-cell touch panel to improve the issue wherein the undesired falling time of a pre-stage shift register and the undesired rising time of a next-stage shift register during a touch sensing period, in which the undesired falling time and the undesired rising time are caused by the output signal of the shift register cannot be correctly transmitted to the pre-stage shift register and the next-stage shift register during the touch sensing period.

1 Claim, 16 Drawing Sheets

(52) U.S. Cl.
CPC ... *G09G 3/3677* (2013.01); *G09G 2310/0267* (2013.01); *G09G 2310/0286* (2013.01); *G09G 2310/08* (2013.01)

(56) References Cited

U.S. PATENT DOCUMENTS

| | | | |
|---|---|---|---|
| 2015/0269897 A1* | 9/2015 | Kitsomboonloha | ........................ G09G 3/3648 345/205 |
| 2016/0132170 A1* | 5/2016 | Zhang | ................... G06F 3/0416 345/173 |
| 2016/0188076 A1* | 6/2016 | Hao | ..................... G06F 3/0416 345/173 |
| 2016/0365061 A1* | 12/2016 | Hong | ..................... G06F 3/041 |
| 2017/0123556 A1* | 5/2017 | Lin | ....................... G06F 3/0412 |

* cited by examiner

GATE DRIVING CIRCUIT FOR DRIVING A PIXEL ARRAY HAVING A TRIGGER CIRCUIT FOR RECEIVING A TOUCH SENSING SIGNAL

CROSS REFERENCE TO RELATED APPLICATIONS

This application claims the benefit of U.S. Provisional Application No. 62/193,787, filed on Jul. 17, 2015 and the benefit of U.S. Provisional Application No. 62/202,570, filed on Aug. 7, 2015, the entirety of which is incorporated by reference herein.

This application claims priority of Taiwan Patent Application No. 104144407, filed on Dec. 30, 2015, the entirety of which is incorporated by reference herein.

BACKGROUND OF THE INVENTION

Field of the Invention

The present invention relates to shift registers, and in particular to shift registers in an in-cell touch panel.

Description of the Related Art

Shift registers are widely applied in data driving circuits and gate driving circuits, for controlling the sequences of each data line sampling data signal and generating a scan signal for each gate line. In the data driving circuit, a shift register is used for outputting a select signal to each data line, so that the image data can be written into each data line sequentially. On the other hand, in the gate driving circuit, a shift register is used for generating a scan signal to each gate line, so that the image signals provided to each data line can be written into each pixel.

Usually a gate driving circuit of a panel without touch function includes a plurality of shift registers. Each shift register receives an output signal from a pre-stage shift register and the output signal is as an activating signal of the shift register. As for operation of a gate driving circuit of the touch panel, because it has to detect whether the touch panel is touched, the conventional gate driving circuit and the driving method cannot be applied to the touch panel directly.

FIG. 1 is a diagram of a conventional gate driving circuit. The gate driving circuit in FIG. 1 includes a plurality of shift registers SRC1, SRC2 to SRCN. Except for the shift register in the first stage receiving the activating signal STV to be enabled, other shift registers are enabled when receiving an output signal from a pre-stage shift register, and the shift register is disabled (i.e. turned off) when receiving an output signal of the next-stage shift register. However, regarding the driving mechanism of the touch panel, some period of time must be reserved for touch sensing on the touch panel. In a touch sensing period, the gate driving circuit must stop working temporarily. As a result, the shift register could be unable to receive the output signal of the pre-stage shift register correctly to be turned on, or could be unable to receive the output signal of the next-stage shift register correctly to be turned off.

BRIEF SUMMARY OF THE INVENTION

An embodiment of a gate driving circuit is provided. The gate driving circuit is for driving a pixel array. The gate driving circuit includes a plurality of shift registers. The plurality of shift registers includes a pre-stage shift register and an Nth shift register, a first clock signal is provided to the Nth shift register and is maintained at a the high logic level in a first time interval, and a second clock signal is provided to the pre-stage shift register and is maintained at a high logic level in a second time interval. A frame period of the gate driving circuit includes at least one touch sensing period, and the touch sensing period corresponds to a period between the first time interval and the second time interval. The Nth shift register includes pull-up control circuit, a pull-up output circuit, a pull-down circuit and a trigger circuit. The pull-up control circuit is for receiving an output signal of the pre-stage shift register. The pull-up output circuit is coupled to the pull-up control circuit, and the pull-up output circuit outputs a first output signal to serve as an output signal of the Nth shift register during the non-touch sensing period. The pull-down circuit is coupled to the pull-up output circuit and the pull-up control circuit, and the pull-down circuit receives an output signal of a next-stage shift register (such as (N+1)th shift register) to change the logic level of the first output signal. The trigger circuit is coupled to the pull-up output circuit and the pull-up control circuit, and the trigger circuit receives an output signal from the pre-stage shift register (such as (N−1)th shift register) to be enabled. During a touch sensing period, the trigger circuit additionally outputs a second output signal as an output signal of the Nth shift register according to a touch sensing signal.

Another embodiment of the gate driving circuit is provided to drive a pixel array. The gate driving circuit includes a plurality of shift registers. The plurality of shift registers includes a pre-stage shift register and an Nth shift register, a first clock signal is provided to the Nth shift register and is maintained at a the high logic level in a first time interval, and a second clock signal is provided to the pre-stage shift register and is maintained at a high logic level in a second time interval. A frame period of the gate driving circuit includes a touch sensing period, and the touch sensing period corresponds to a period between the first time interval and the second time interval. The length of time period during which the Nth shift register receives a first clock signal is greater than the length of the touch sensing period.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 2:
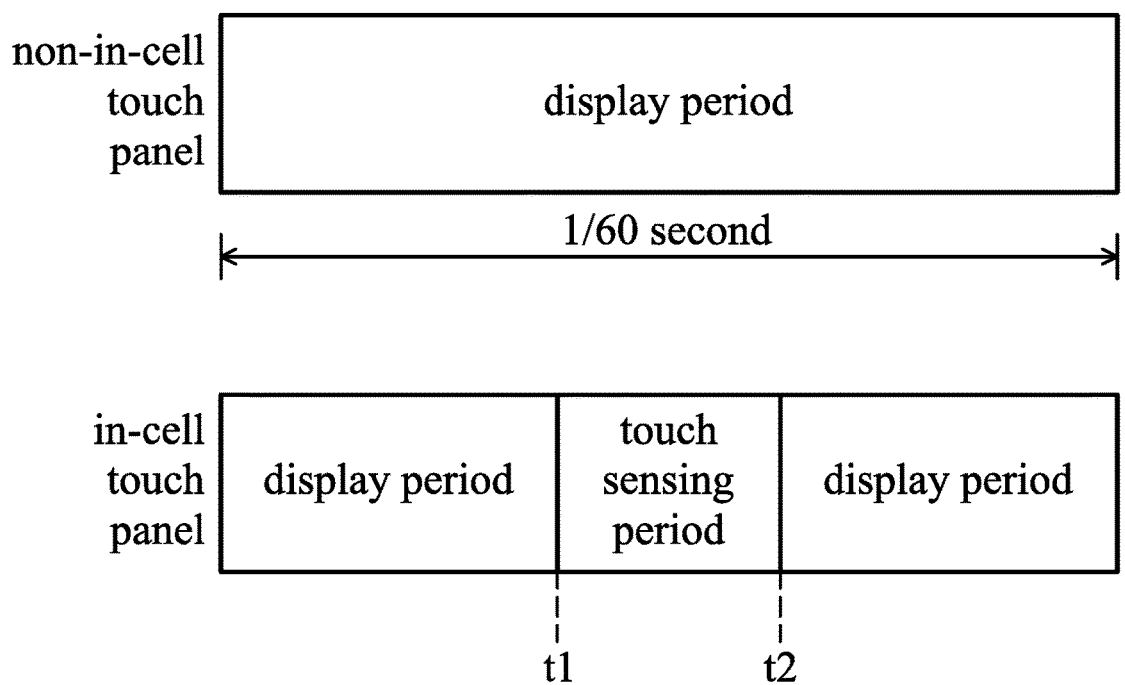
FIG. 2 is a diagram of a display period of an in-cell touch panel and a non-in-cell touch panel according to an embodiment of the present invention.

FIG. 2 is a diagram of a display period of an in-cell touch panel and a non-in-cell touch panel according to an embodiment of the present invention. A frame rate of a liquid-crystal display (LCD) is 60 Hz (i.e. a frame period is 1/60 second), a part of time of the frame period of the in-cell touch is to serve as a touch sensing period, so as to sense a touch of a user. A driving method for driving a plurality of shift registers of the conventional gate driving circuit is that a pre-stage shift register (such as (N−1)th shift register) accepting a second clock signal before the sensing period outputs an output signal to activate a next-stage shift register (such as Nth shift register) accepting a first clock signal after the sensing period. After the sensing period, the next-stage shift register (such as Nth shift register) outputs an output signal to the pre-stage shift register (such as (N−1)th shift register) to accelerate the output signal of the pre-stage shift register to quickly be pulled down to a low voltage level. During the touch sensing period, the shift registers in the gate driving circuit cannot be activated correctly, which can easily result in abnormalities of the rising time or the falling time of the output signal of the shift register, before and after the touch sensing period. Therefore, an external signal and a circuit are needed to solve this problem.

The gate driving circuit is driven sequentially, so that affected shift registers can be known if the initial time t1 and the finish time t2 of the touch sensing period are known. Then, the abnormality of the gate driving circuit of the in-cell touch panel can be solved by the external input signal or by modifying the circuit of the shift register.

Figure 3:
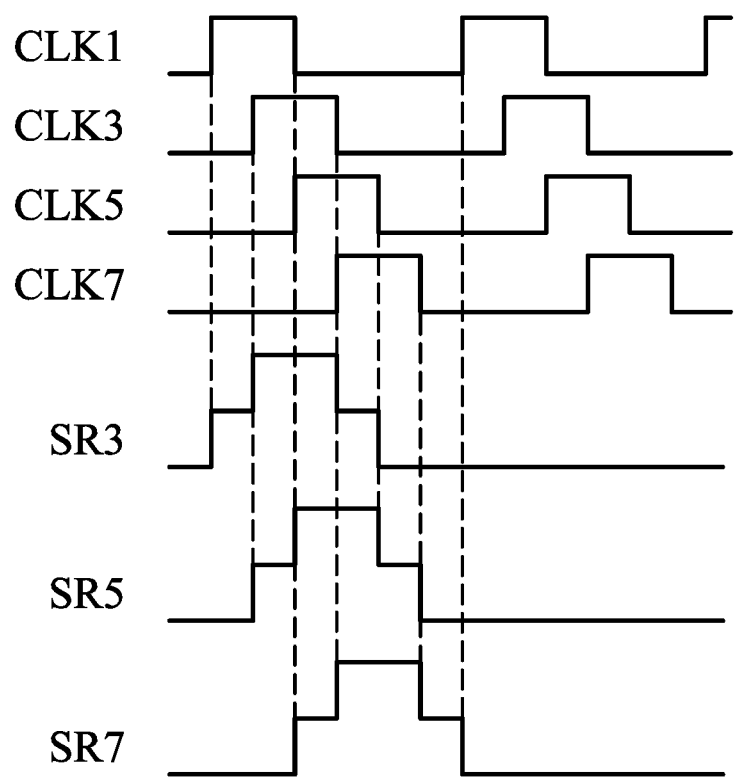
FIG. 3 is a diagram illustrating clock signals of the shift registers in the gate driving circuit of a non-in-cell touch panel according to an embodiment of the present invention.

FIG. 3 is a diagram illustrating clock signals of the shift registers in the gate driving circuit of a non-in-cell touch panel according to an embodiment of the present invention. Only four shift registers are described for example in FIG. 3, and the four shift register are connected in series. In FIG. 3, CLK1, CLK3, CLK5 and CLK7 represent the clock signals. SR3, SR5 and SR7 are pull-up control signals of those respective shift registers. As shown in FIG. 3, the pull-up control signal of shift register SR5 is charged to a first voltage level due to the clock signal CLK3, and then the pull-up control signal of shift register SR5 is pulled up to a second voltage level when receiving the clock signal CLK5. After that, when the clock signal CLK5 changes from a high voltage level to a low voltage level, the pull-up control signal of shift register SR5 is pulled down to the first voltage level. Then, when the shift register SR5 detects that the clock signal CLK7 changes from the high voltage level to the low voltage level, the pull-up control signal of shift register SR5 is pulled down to a third voltage level.

Figure 4:
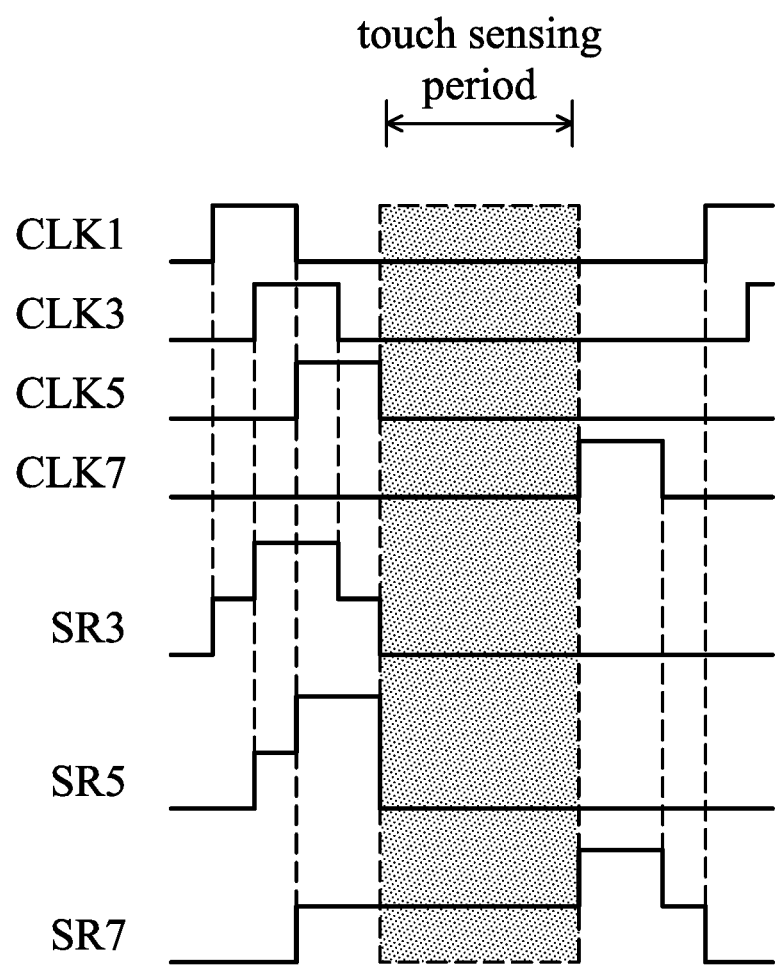
FIG. 4 is a diagram illustrating clock signals of the shift registers in the gate driving circuit of an in-cell touch panel according to an embodiment of the present invention.

FIG. 4 is a diagram illustrating clock signals of the shift registers in the gate driving circuit of an in-cell touch panel according to an embodiment of the present invention. In FIG. 4, a touch sensing period is arranged as a period between the clock signal CLK5 and clock signal CLK7, the clock signal CLK5 is provided to the shift register SR5, and the clock signal CLK7 is provided to the shift register SR7. Therefore, during the touch sensing period, a clock source stops outputting the clock signals temporarily, so that the pull-up control signal of the shift register SR5 is not charged by the output signal of the shift register SR7, and a voltage level of the pull-up control signal of the shift register SR5 becomes lower, resulting in affecting a falling time of an output signal (not shown in figures). Meanwhile, the shift register SR7 is not enabled by an output signal of the shift register SR5 during the touch sensing period, so that a voltage level of the pull-up control signal of the shift register SR7 could not be leveled up, affecting the rising time of the output signal (not shown in figures). Consequently, different mechanisms of the invention are disclosed to improve the shift registers corresponding to the touch sensing period, such as the rising time or the falling time of the shift register SR5 and SR7.

Figure 5:
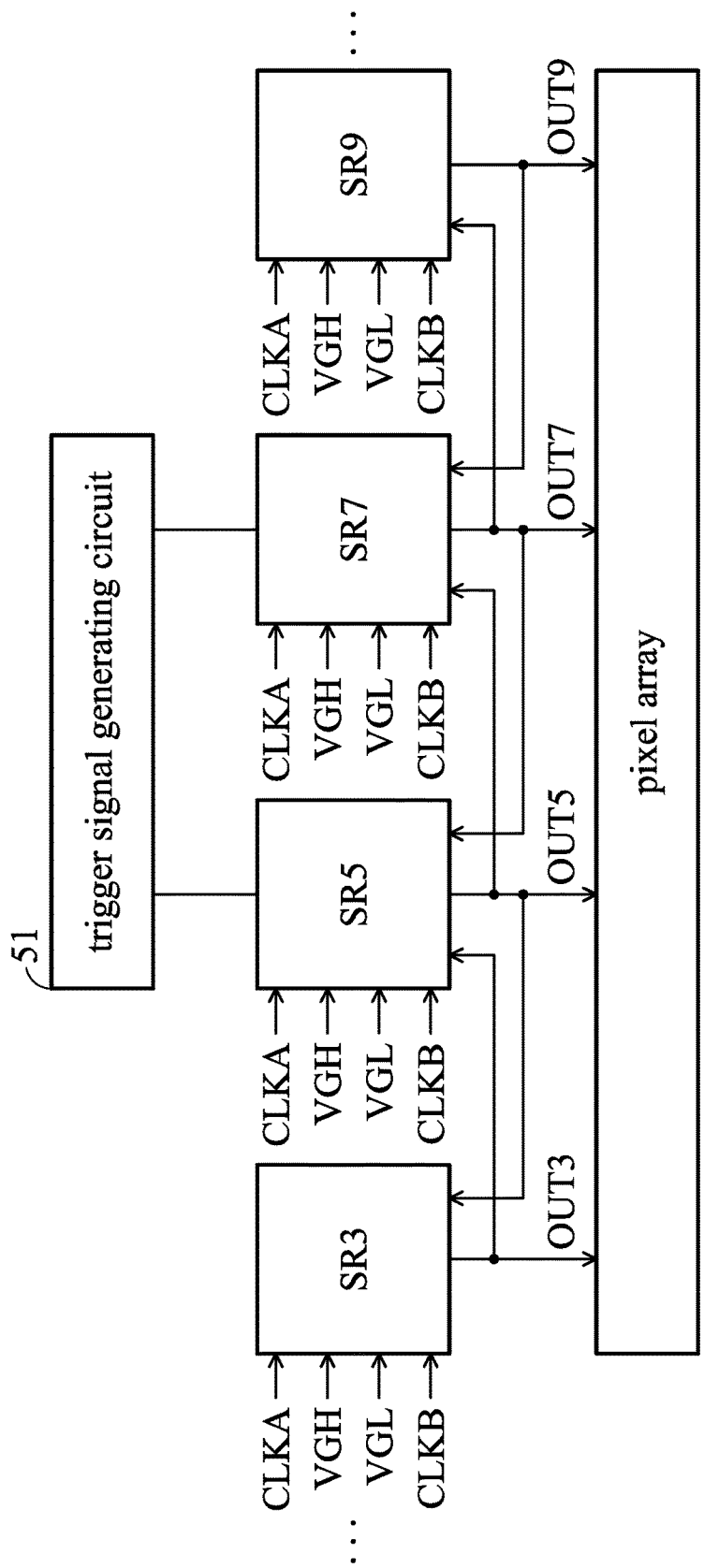
FIG. 5 is a diagram of the in-cell touch panel according to an embodiment of the present invention.

Please refer to FIG. 5 for ways to solve this problem. FIG. 5 is a diagram of the in-cell touch panel according to an embodiment of the present invention. Only parts of components are described in FIG. 5, but this is not meant to limit the invention. In this embodiment, the touch sensing period is generated between the shift register SR5 and SR7, so a trigger signal generating circuit 51 outputs a trigger signal to the shift register SR5 and/or SR7 to improve the problems described before. In this embodiment, the trigger signal generating circuit 51 generates at least one trigger signal to the shift register SR5 to improve the falling time of the output signal of the shift register SR5. In another embodiment, the trigger signal generating circuit 51 respectively generates two different trigger signals to the shift register SR5 and the shift register SR7, so as to improve the falling time of the output signal of the shift register SR5 and the rising time of the output signal of the shift register SR7. About the trigger signals generated by the trigger signal generating circuit 51: please refer to FIG. 7A to FIG. 7C. About the clock signal after having been adjusted: please refer to FIG. 6.

Figure 1:
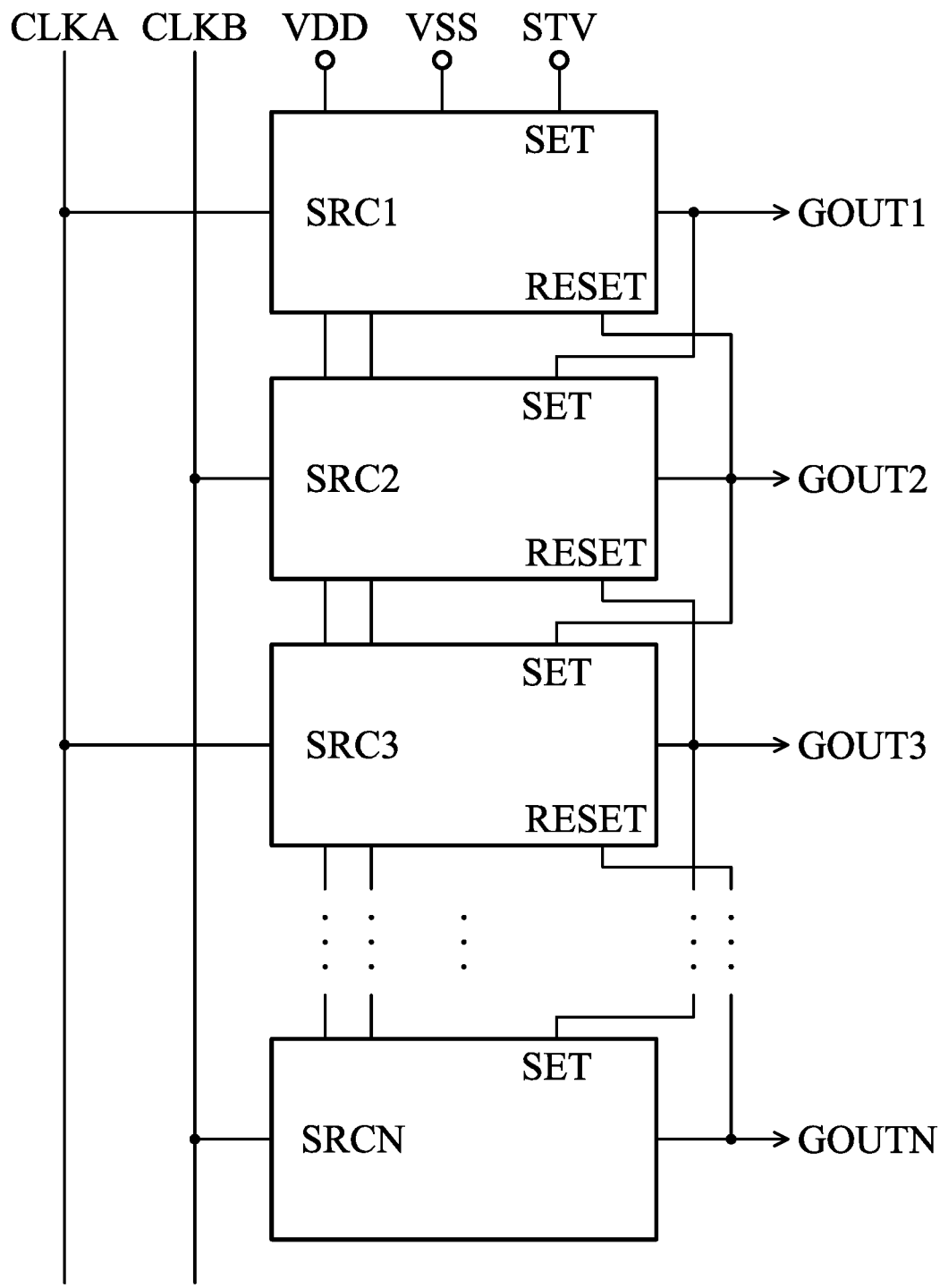
FIG. 1 is a diagram of a conventional gate driving circuit.
Figure 6:
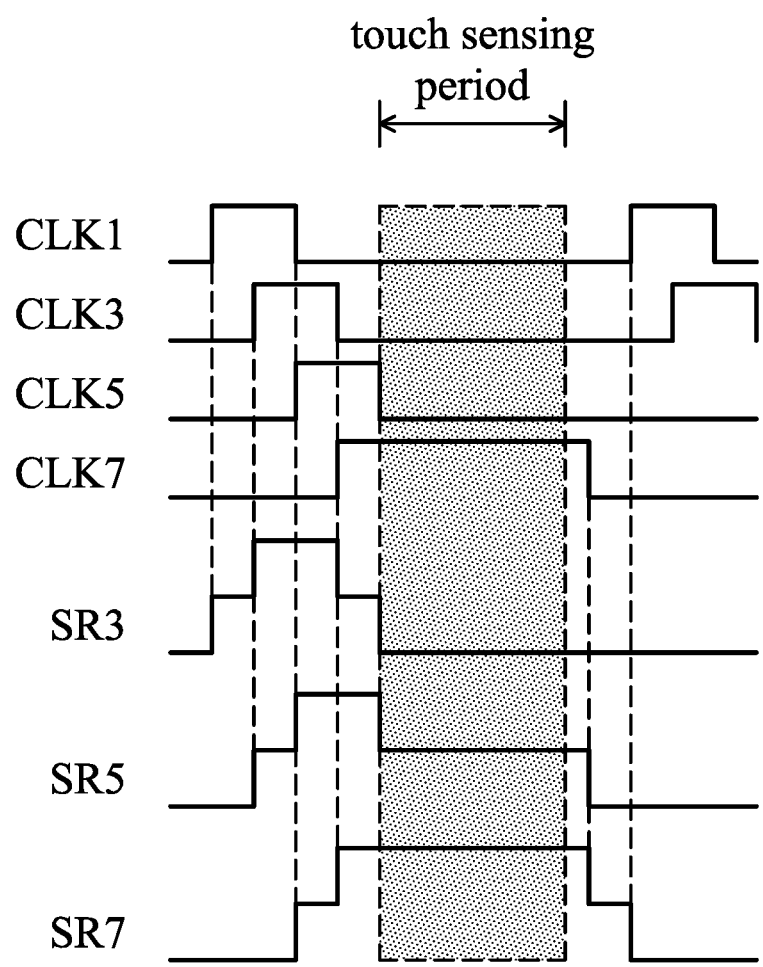
FIG. 6 is a diagram illustrating clock signals of the shift registers in the gate driving circuit of the in-cell touch panel according to an embodiment of the present invention.

FIG. 6 is a diagram illustrating clock signals of the shift registers in the gate driving circuit of the in-cell touch panel according to an embodiment of the present invention. Please also refer to FIG. 4 and FIG. 1. As shown in FIG. 4, during the touch sensing period, all the clock signals are maintained at the low voltage level (i.e. the clock signal is not generated). Therefore, during the touch sensing period in this embodiment, the clock signals input to the shift registers SR5 and SR7 are adjusted. In FIG. 6, the clock signal input to the shift register SR7 is adjusted to be maintained at the high voltage level during the touch sensing period. This can ensure that the pull-up control signal of the shift register SR5 can be maintained at a first logic level correctly, and the pull-up control signal of the shift register SR7 can be maintained at a second logic level correctly (a higher logic level).

Figure 7A:
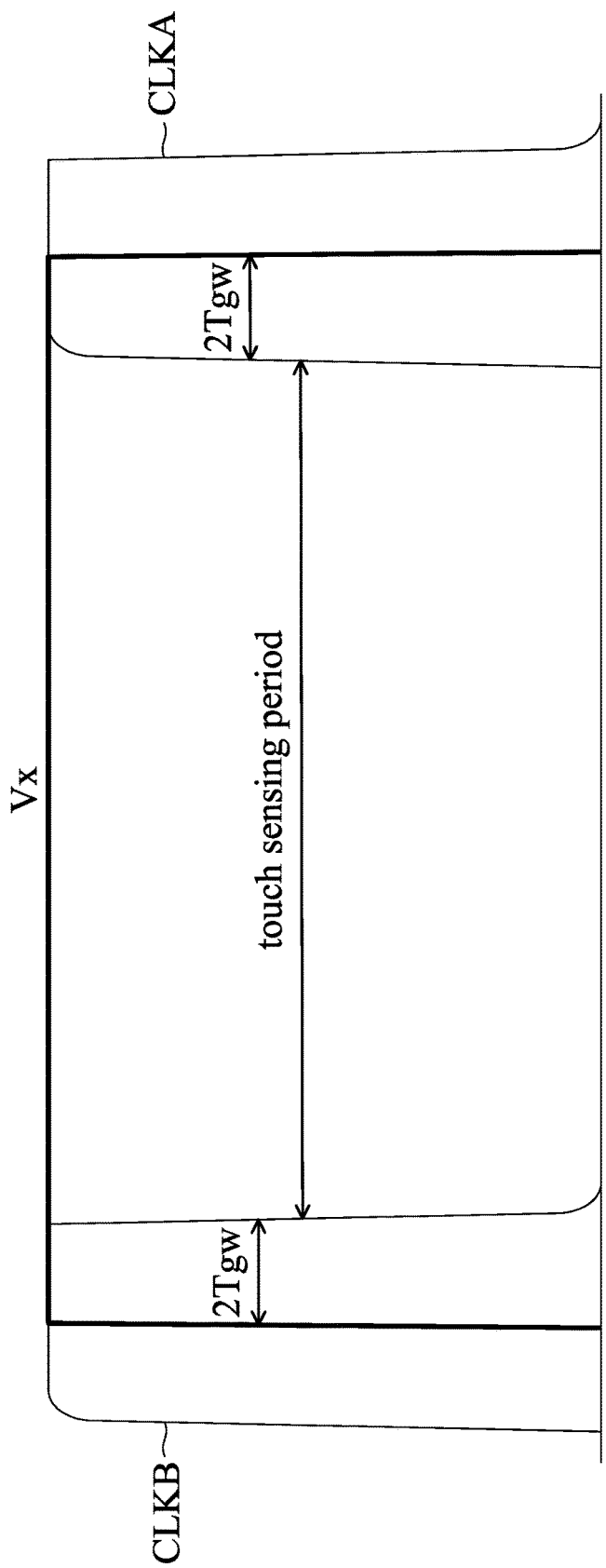
FIG. 7A is a diagram of a trigger signal according to an embodiment of the present invention.

FIG. 7A is a diagram of a trigger signal according to an embodiment of the present invention. In the prior art, during the touch sensing period, the clock signal source stops outputting the clock signal. Therefore, in FIG. 7A, after a clock signal CLKB, there is no clock signal generated during the touch sensing period, and a clock signal CLKA is generated after the touch sensing period. In FIG. 7A, a touch sensing signal Vx is an external signal, and the period in which the touch sensing signal is maintained at the high logic level at least covers the entire touch sensing period. The touch sensing signal Vx is used to serve as a phase of a trigger signal of an output signal (such as OUT(N−1)) of a shift register before the touch sensing period and a phase of a trigger signal of an output signal (such as OUT N) of a shift register after the touch sensing period, so as to improve the effect of the falling time of the shift register before the touch sensing period and the effect of the rising time of the shift register after the touch sensing period, and the effects are caused by the stop of the clock signal during the touch sensing period.

The duration of a gate pulse is assumed to be 1 Tgw, and the duration of each clock signal is 4 Tgw which is four times of the gate pulse. It should be noted that the duration of each clock signal can vary depending on demand, and 1 Tgw indicates the time during which a data line charges the pixel. In this embodiment, the length of an overlapped time of the touch sensing signal Vx and the clock signal CLKB corresponding to the pre-stage shift register (such as SR(N−1)) is at least 2 Tgw, and the length of an overlapped time of the touch sensing signal Vx and the clock signal CLKA corresponding to the next-stage shift register (such as SR(N)) is at least 2 Tgw. In this embodiment, the touch sensing signal Vx has to overlap a half of the duration of the clock signal CLKA and to overlap a half of the duration of the clock signal CLKB, but the tolerance is 0.5 microsecond (ms). That is, the overlapping length of time is between 2 Tgw-0.5 ms and 2 Tgw+0.5 ms. In other words, the duration of 1 Tgw is 0.5 ms in this embodiment. In this embodiment, the duration of the touch sensing signal Vx is touch sensing period (TTP)+4 Tgw, wherein TTP is the duration of the touch sensing period. In other words, in FIG. 7A, a pre-stage shift register (the (N−1)th shift register) before the touch sensing period is enabled from an output signal of a (N−2)th shift register to be outputted and until the touch sensing signal Vx be pulled down. A next-stage shift register (the Nth shift register) after the touch sensing period is enabled from the touch sensing signal Vx to be leveled up and until the clock signal CLKA to be pulled down.

Figure 7B:
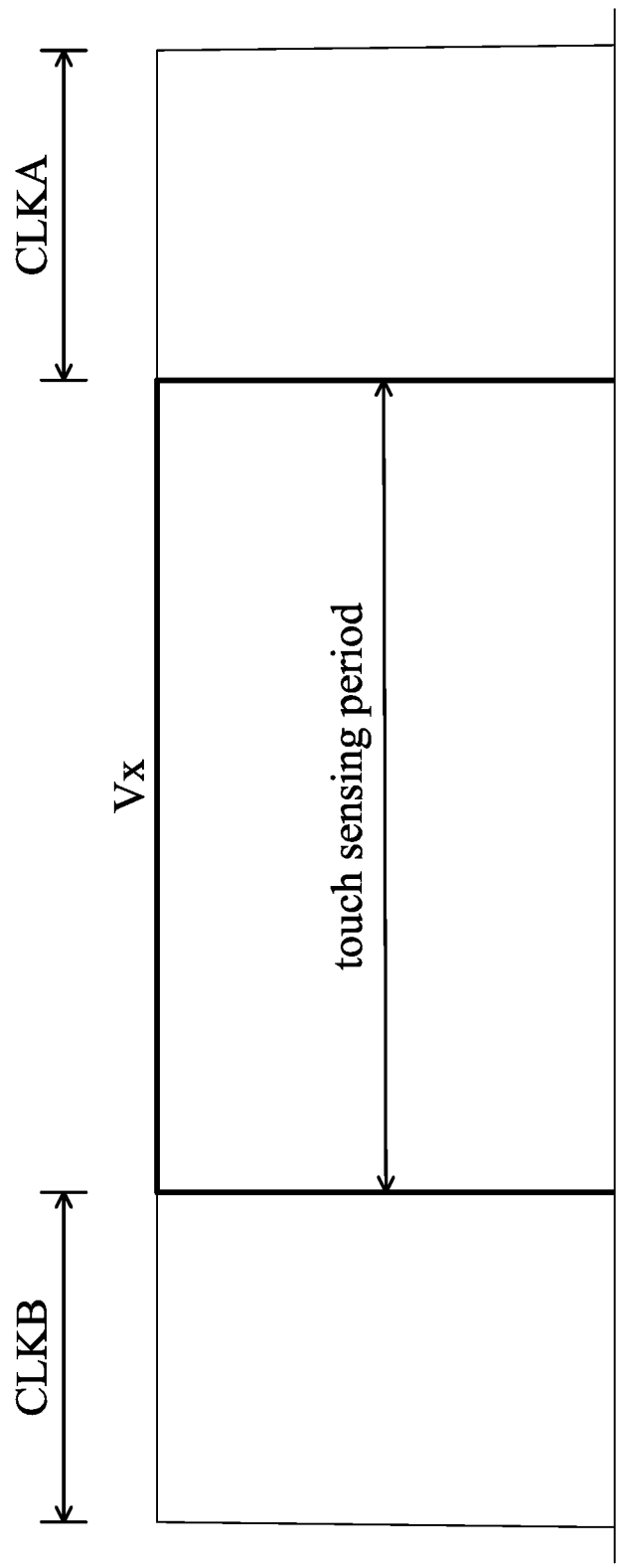
FIG. 7B is a diagram of a trigger signal according to another embodiment of the present invention.

FIG. 7B is a diagram of a trigger signal according to another embodiment of the present invention. In the prior art, during the touch sensing period, the clock signal source stops outputting the clock signal. Therefore, in FIG. 7B, after the clock signal CLKB, there is no clock signal generated during the touch sensing period, and the clock signal CLKA is generated after the touch sensing period.

In FIG. 7B, the touch sensing signal Vx is an external signal, and the period during which the touch sensing signal Vx is maintained at the high logic level covers the entire touch sensing period. The touch sensing signal Vx is used to serve as a phase of a trigger signal of the pull-up control circuit of the shift register before the touch sensing period and a phase of a trigger signal of the pull-up control circuit of the shift register after the touch sensing period, so as to improve the effect of the falling time of the shift register before the touch sensing period and the effect of the rising time of the shift register after the touch sensing period.

In this embodiment, when the clock signal CLKB changes from the high logic level to a low logic level, the touch sensing signal Vx is leveled up to the high logic level, and when the clock signal CLKA changes to the high logic level, the touch sensing signal Vx is pulled down to the low logic level. In other words, in FIG. 7B, the period during which the touch sensing signal Vx is maintained at the high logic level is equal to the duration of the touch sensing period.

Figure 7C:
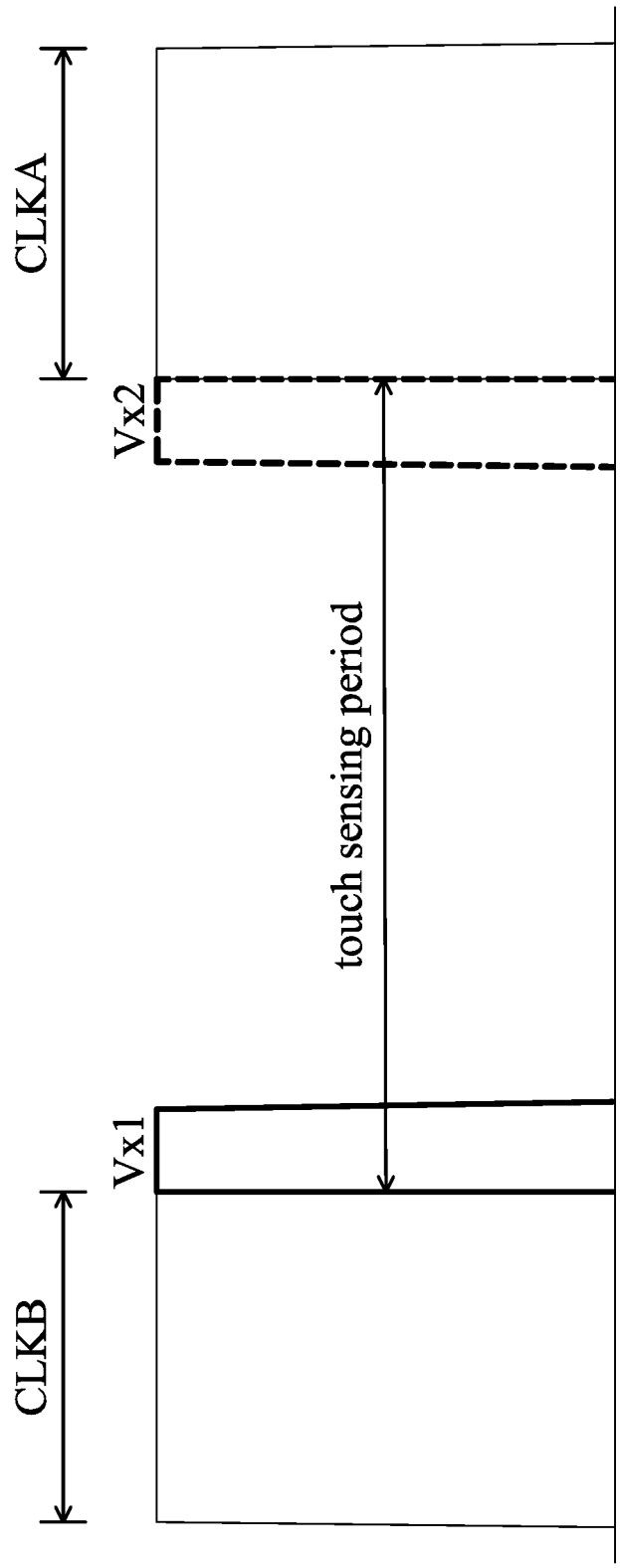
FIG. 7C is a diagram of a trigger signal according to another embodiment of the present invention

FIG. 7C is a diagram of a trigger signal according to another embodiment of the present invention. The touch sensing signal Vx in FIG. 7C includes a first touch sensing signal Vx1 after the clock signal CLKB and a second touch sensing signal Vx2 before the clock signal CLKA. In this embodiment, the duration of the first touch sensing signal Vx1 and the second touch sensing signal Vx2 is at least 1 Tgw. The first touch sensing signal Vx1 is used for pulling up the pull-up control signal of the pre-stage shift register (such as the (N−1)th shift register), so as to decrease the falling time of the output signal of the pre-stage shift register. The second touch sensing signal Vx2 is used for a reverse scan. When in the reverse scan, the clock signal CLKA is provided to the shift register (pre-stage shift register) before the touch sensing period and the clock signal CLKB is provided to the shift register (next-stage shift register) after the touch sensing period, so that the second touch sensing signal Vx2 is used for pulling up the pull-up control signal of the pre-stage shift register for the reverse scan, so as to decrease the falling time of the output signal of the pre-stage shift register.

In an embodiment of the present invention, the gate driving circuit of the in-cell touch panel includes a plurality of cascaded shift registers. The plurality of shift registers includes a pre-stage shift register and an Nth shift register, a first clock signal is provided to the Nth shift register and is maintained at a the high logic level in a first time interval, and a second clock signal is provided to the pre-stage shift register and is maintained at a high logic level in a second time interval. When the touch sensing period of the in-cell touch panel is generated at the period between the first time interval and the second time interval, the duration of the first clock signal received by the Nth shift register has to be greater than or equal to the length of the touch sensing period. As shown in FIG. 6, in another embodiment, in addition to the duration of the first clock signal received by the Nth shift register at the high logic level having to be greater than the length of the touch sensing period, the duration of the second clock signal received by the (N−1)th shift register at the high logic level has to be greater than the length of the touch sensing period, too. In addition, in another embodiment, the duration of the first clock signal received by the Nth shift register at the high logic level must be greater than the length of the touch sensing period and a time point at which the logic level of the first clock signal rises is earlier than a time point at which the logic level of the second clock signal falls.

In one embodiment, a clock generation circuit in the in-cell touch panel can directly generate a clock signal CLK7 (as shown in FIG. 6) according to the touch sensing signal.

In the description above, some of embodiments are mainly using the method of changing the clock signal received by the shift register. However, based on the previously described concept, the purpose of the present invention can also be achieved by changing the circuit of the shift register. The present invention provides a plurality of embodiments of shift registers, and the shift registers in those embodiments can be applied in the in-cell touch panel. During the touch sensing period, those shift registers can receive the touch sensing signal Vx and output an output signal to the shift register before the touch sensing period (the pre-stage shift register, such as the (N−1)th shift register) and the shift register after the touch sensing period (the next-stage shift register, such as the Nth shift register), so as to improve the falling time of the pre-stage shift register and the rising time of the next-stage shift register. The shift register in some embodiments can be applied to all shift register of the gate driving circuit, but the shift register in some embodiments can only be applied to the shift registers before and adjacent to the touch sensing period or after and adjacent to the touch sensing period.

Figure 8A:
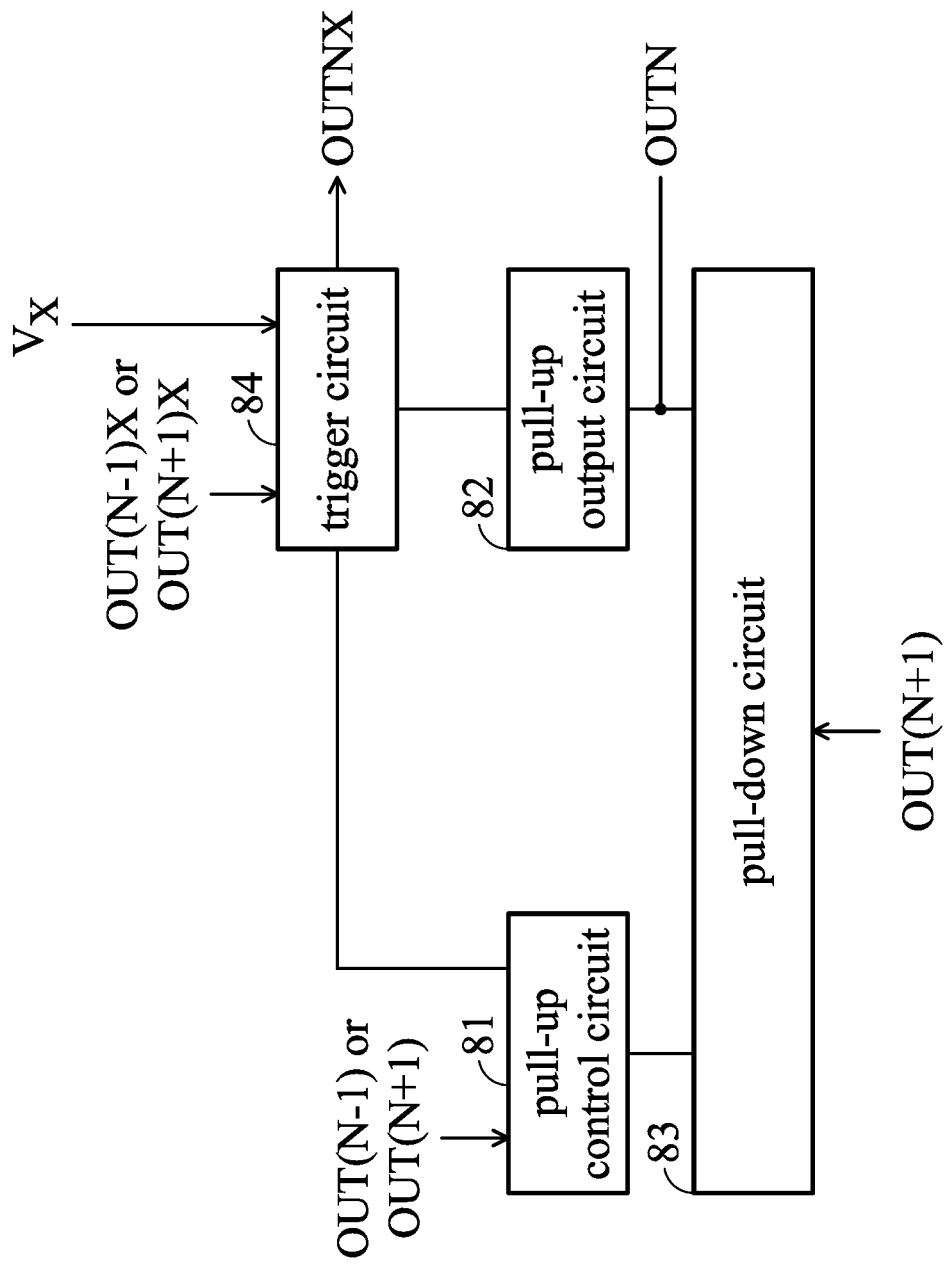
FIG. 8A is a diagram of a shift register in the gate driving circuit according to an embodiment of the present invention.

FIG. 8A is a diagram of a shift register in the gate driving circuit according to an embodiment of the present invention. The shift register in this embodiment is the next-stage shift register (such as the Nth shift register) accepting the clock signal adjacent to and after the touch sensing period. Take the embodiment of FIG. 5 for example: the shift register in FIG. 8A is the shift register SR7 in FIG. 5. In another example, the shift register in this embodiment can be applied to all shift registers in the gate driving circuit. If the shift register is the next-stage shift register accepting the clock signal adjacent to and after the touch sensing period, the shift register additionally outputs a second output signal OUTNX during the touch sensing period. Take the embodiment of FIG. 5 for example: the shift register SR7 outputs the second output signal OUTNX to the shift register SR5. If the shift register is not the pre-stage shift register accepting the clock signal adjacent to and just before the touch sensing period or the next-stage shift register accepting the clock signal adjacent to and just after the touch sensing period, the shift register outputs a first output signal OUTN during the non-touch sensing period. Take the embodiment of FIG. 5 for example: the shift register SR7 outputs the first output signal OUT7 to the shift register SR5 and the shift register SR9.

As for the shift register accepting the clock signal adjacent to and just after the touch sensing period (such as the Nth shift register); the shift register includes a pull-up control circuit 81, a pull-up output circuit 82, a pull-down circuit 83 and a trigger circuit 84. The pull-up control circuit 81 receives the first output signal of the pre-stage shift register, such as the OUT(N−1) or OUT(N+1). When the gate driving circuit is scanned forward, the output signal of the pre-stage shift register is OUT(N−1). When the gate driving circuit is scanned in reverse, the output signal of the pre-stage shift register is OUT(N+1). It should be noted that the pre-stage shift register is denoted by N−1 or N+1 for description, but in other embodiments, a shift register may connect to other shift registers at a regular interval. That is, a previous stage before the Nth shift register may be a (N−Y)th shift register or a (N+Y)th shift register, and Y is an integer which is less than N. As shown in FIG. 5, Y is 2.

The pull-up output circuit 82 is coupled to the pull-up control circuit 81 and receives a first clock signal (not shown in figures). The pull-down circuit 83 receives the first output signal OUT(N+1) or OUT(N−1) of the next-stage shift register (in forward scan, the next stage is the (N+1)th shift register; in reverse scan, the next-stage is the (N−1)th shift register). During the non-touch sensing period, the pull-up output circuit 82 is used for outputting a first output signal OUTN to serve as the output signal of the shift register. Similarly, when the gate driving circuit is scanned forward, the first output signal of the next-stage shift register is OUT(N+1). When the gate driving circuit is scanned in reverse, the first output signal of the next-stage shift register is OUT(N−1).

As for the shift register accepting the clock signal adjacent to and after the touch sensing period (such as the Nth shift register); the trigger circuit 84 receives a second output signal OUT(N−1)X or OUT(N+1)X from the pre-stage shift register and the touch sensing signal Vx. During the touch sensing period, the touch sensing signal Vx is pulled up to the high voltage level and is output to the trigger circuit 84. The trigger circuit 84 receives the second output signal OUT(N−1)X or OUT(N+1)X from the pre-stage shift register, and the Nth shift register outputs the second output signal OUTNX at this time.

Figure 8B:
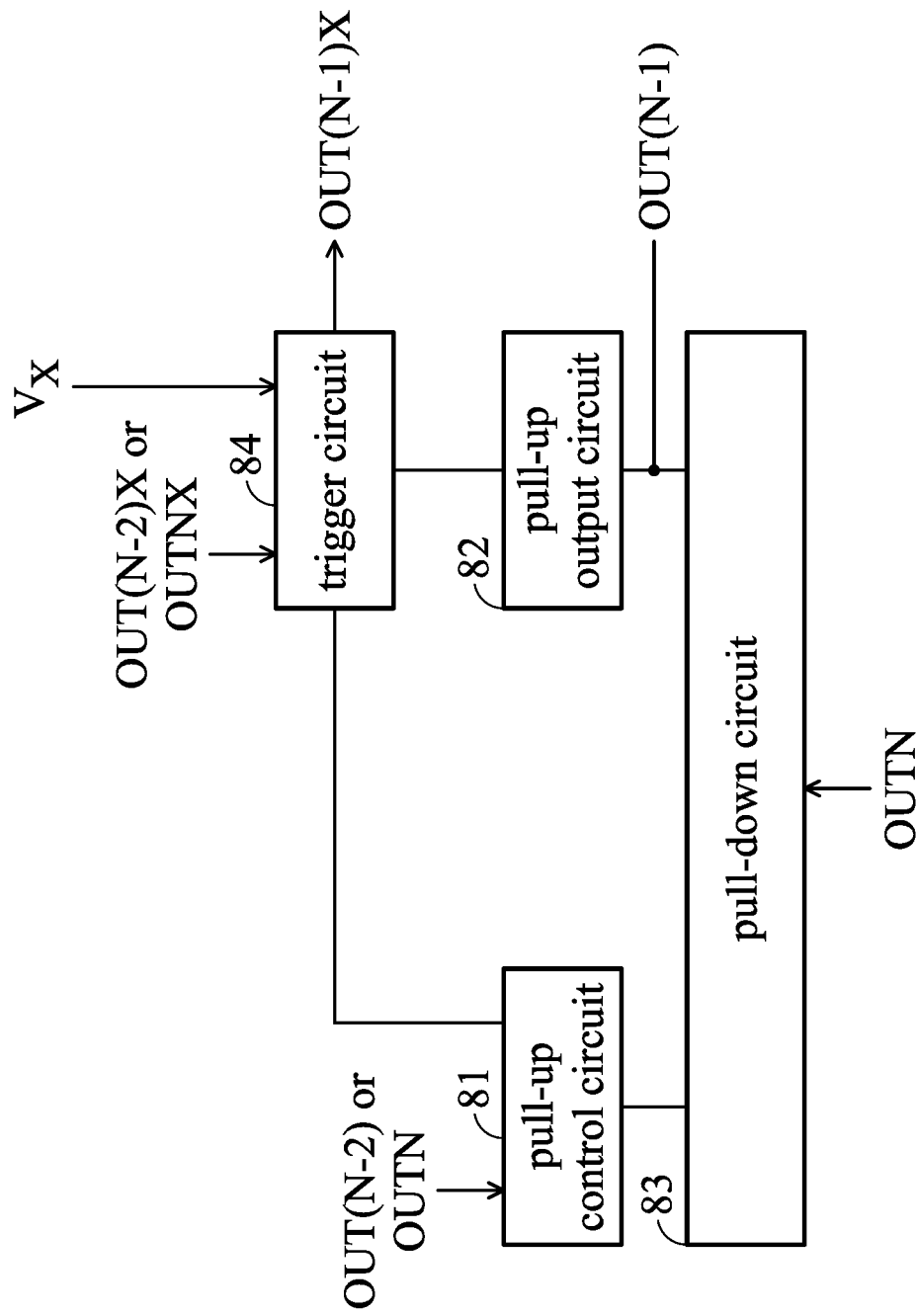
FIG. 8B is a diagram of a shift register in the gate driving circuit according to another embodiment of the present invention.

As for the shift register accepting the clock signal adjacent to and before the touch sensing period (such as the (N−1)th shift register); please refer to FIG. 8B. The shift register includes the pull-up control circuit 81, the pull-up output circuit 82, the pull-down circuit 83 and the trigger circuit 84. The pull-up control circuit 81 receives an output signal of the pre-stage shift register corresponding to the (N−1)th shift register, such as OUT(N−2) or OUTN. When the gate driving circuit is scanned forward, the output signal received by the pull-up control circuit of the (N−1)th shift register is OUT(N−2). When the gate driving circuit is scanned in reverse, the output signal received by the pull-up control circuit is OUTN.

As for the shift register accepting the clock signal adjacent to and before the touch sensing period (such as the (N−1)th shift register); the pull-up output circuit 82 receives a second clock signal CLK2 (not shown in figures) and is coupled to the pull-up control circuit 81.

As for the shift register accepting the clock signal adjacent to and before the touch sensing period (such as the (N−1)th shift register); the pull-down circuit 83 receives the first output signal of the next-stage shift register corresponding to the (N−1)th shift register, such OUTN or OUT(N−2), and the pull-up output circuit 82 output the first output signal OUT(N−1). Similarly, when the gate driving circuit is scanned forward, the first output signal of the next-stage shift register is OUTN. When the gate driving circuit is scanned in reverse, the first output signal of the next-stage shift register is OUT(N−2).

As for the shift register accepting the clock signal adjacent to and before the touch sensing period (such as the (N−1)th shift register); the trigger circuit 84 receives a second output signal OUTNX or OUT(N−2)X from the next-stage shift register corresponding to the (N−1)th shift register and the touch sensing signal Vx. During the touch sensing period, the touch sensing signal Vx is pulled up to the high voltage level and is output to the trigger circuit 84. The trigger circuit 84 receives the second output signal OUTNX or OUT(N−2)X from the next-stage shift register, and the (N−1)th shift register outputs the second output signal OUT(N−1)X at this time.

Take the pre-stage shift register SR35 and the next-stage shift register SR36 for example: the pre-stage shift register SR35 accepted a clock signal CLK35 (no shown in the Figures), the next-stage shift register SR36 accepted a clock signal CLK36 (no shown in the Figures), and a period between CLK35 and CLK36 corresponds to a touch sensing period. Previously the shift register SR35 cannot receive an output signal of the shift register SR36 during the touch sensing period, so that a falling time of the shift register SR35 is prolonged. By using the trigger circuit in this embodiment, the shift register SR36 still generates a second output signal OUT36X to the shift register SR35 during the touch sensing period, so that the falling time of the shift register SR35 can be improved. Similarly, during the touch sensing period, the shift register SR36 can still receive a second output signal OUT35X from the shift register SR35, so as to improve the rising time of the shift register SR36.

In the present invention, the trigger signal generating circuit 51 in FIG. 5 can be applied to the shift register shown in FIG. 8, the trigger signal output from the trigger signal generating circuit 51 can be used to determine whether the trigger circuit 84 is enabled or not.

Figure 9:
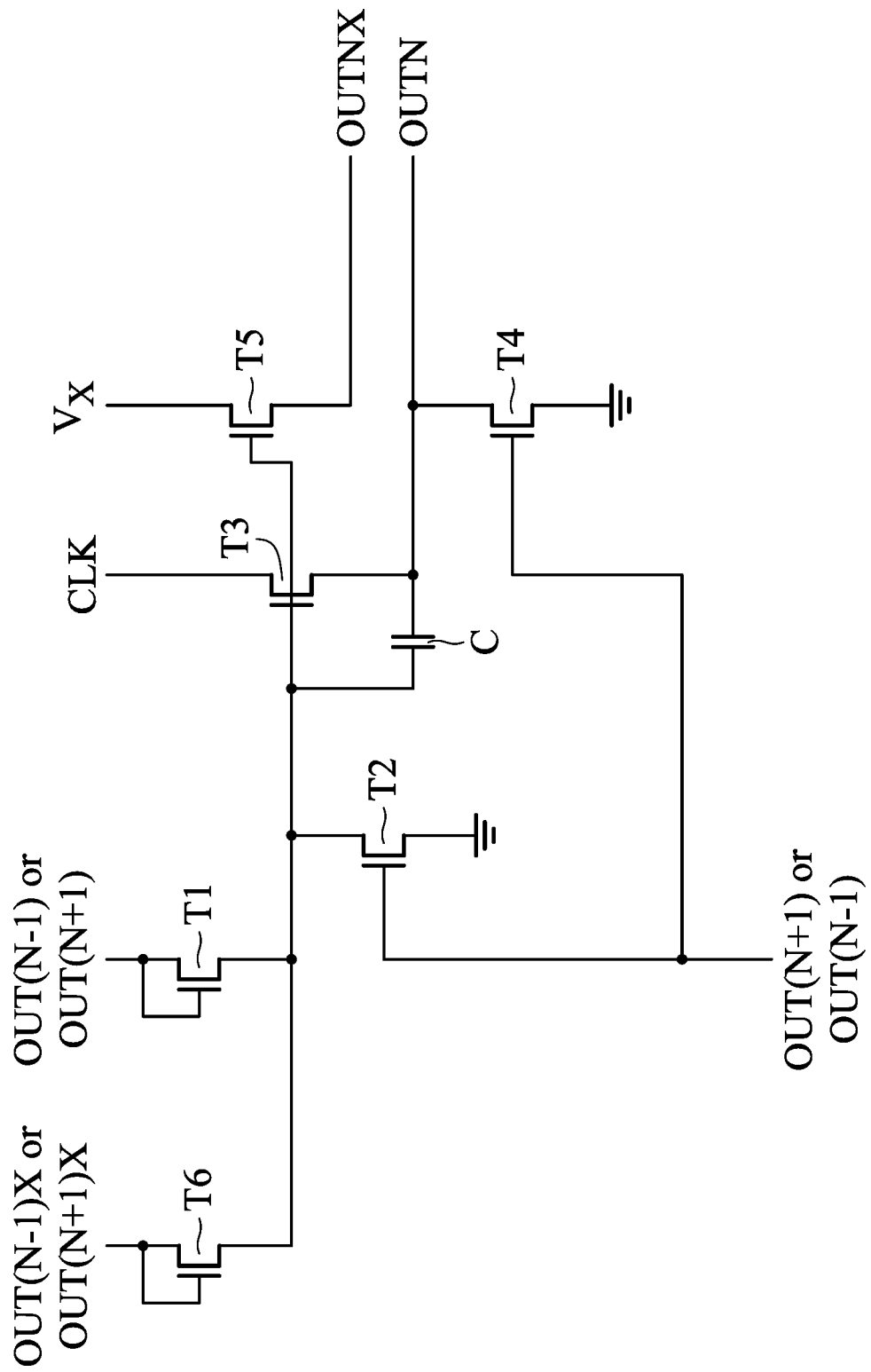
FIG. 9 is a diagram of a shift register in the gate driving circuit according to another embodiment of the present invention.

FIG. 9 to FIG. 12 are diagrams respectively illustrating four embodiments of a shift register in the gate driving circuit of the present invention, and the shift register is described as a shift register (the Nth shift register) accepting the clock signal adjacent to and after the touch sensing period. FIG. 9 is a diagram illustrating a shift register in the gate driving circuit according to an embodiment of the present invention. The shift register comprises a plurality of transistors and a capacitor. A first transistor T1 corresponds to the pull-up control circuit 81 in FIG. 8A and FIG. 8B, a second transistor T2 and a fourth transistor T4 correspond to the pull-down circuit 83 in FIG. 8A and FIG. 8B. A third transistor T3 corresponds to the pull-up output circuit 82 in FIG. 8A and FIG. 8B, and a fifth transistor T5 and a sixth transistor T6 correspond to the trigger circuit 84 in FIG. 8A and FIG. 8B.

An input terminal of the first transistor T1 is coupled to a gate terminal of the first transistor T1, so as to receive the first output signal OUT(N−1) or OUT(N+1) of the pre-stage shift register. The second transistor T2 includes an input terminal coupled to an output terminal of the first transistor T1. A gate terminal of the second transistor T2 receives the first output signal OUT(N+1) or OUT(N−1) of the next-stage shift register, and an output terminal of the second transistor T2 is connected to the ground or a relatively low voltage level. The third transistor T3 includes an input terminal for receiving the clock signal CLK. A gate terminal of the third transistor T3 is coupled to the output terminal of the first transistor T1. An output terminal of the third transistor T3 outputs the first output signal OUTN of the shift register. The fourth transistor T4 includes an input terminal coupled to an output terminal of the third transistor T3. A gate terminal of the fourth transistor T4 receives the first output signal OUT(N+1) or OUT(N−1) of the next-stage shift register. An output terminal of the fourth transistor T4 is connected to the ground or the relatively low voltage level. A capacitor C includes a first terminal coupled to the output terminal of the first transistor T1 and a second terminal coupled to the output terminal of the third transistor T3.

The fifth transistor T5 includes an input terminal for receiving the touch sensing signal Vx. A gate terminal of the fifth transistor T5 is coupled to the output terminal of the first transistor T1. An output terminal of the fifth transistor T5 outputs the second output signal OUTNX. An input terminal of the sixth transistor T6 is coupled to a gate terminal of the sixth transistor T6 for receiving the second output signal OUT(N−1)X or OUT(N+1)X of the pre-stage shift register. An output terminal of the sixth transistor T6 is coupled to the output terminal of the first transistor T1.

As for the shift register accepting the clock signal adjacent to and before the touch sensing period (such as the (N−1)th shift register); the connections of those transistors are similar to the shift register accepting the clock signal adjacent to and after the touch sensing period (such as the Nth shift register). The difference between the two shift registers is that the input terminal of the sixth transistor T6 of the shift register accepting the clock signal adjacent to and after the touch sensing period (such as the Nth shift register) receives the second output signal OUT(N−1)X of the pre-stage shift register when in a forward scan, and the input terminal of the sixth transistor T6 of the shift register accepting the clock signal adjacent to and before the touch sensing period (such as the (N−1)th shift register) receives the second output signal OUTNX of the Nth shift register.

In a general situation (in the display period), the touch sensing signal Vx is at the low voltage level. At this time, the shift register levels up the voltage levels of the control signal to the pre-stage shift register and the next-stage shift register by the first output signal OUTN. At this time, a voltage level of the first output signal OUTN is determined by the clock signal CLK. During the touch sensing period, the shift register levels up the voltage level of the control signal to the pre-stage shift register and the next-stage shift register by the second output signal OUTNX. At this time, the voltage level of the second output signal OUTNX is determined by the touch sensing signal Vx.

In this embodiment, the trigger signal generating circuit 51 in FIG. 5 can be applied to the shift register as shown in FIG. 9. The trigger signal output from the trigger signal generating circuit 51 is for determining the voltage level of the second output signal OUTNX of the shift register.

Figure 10:
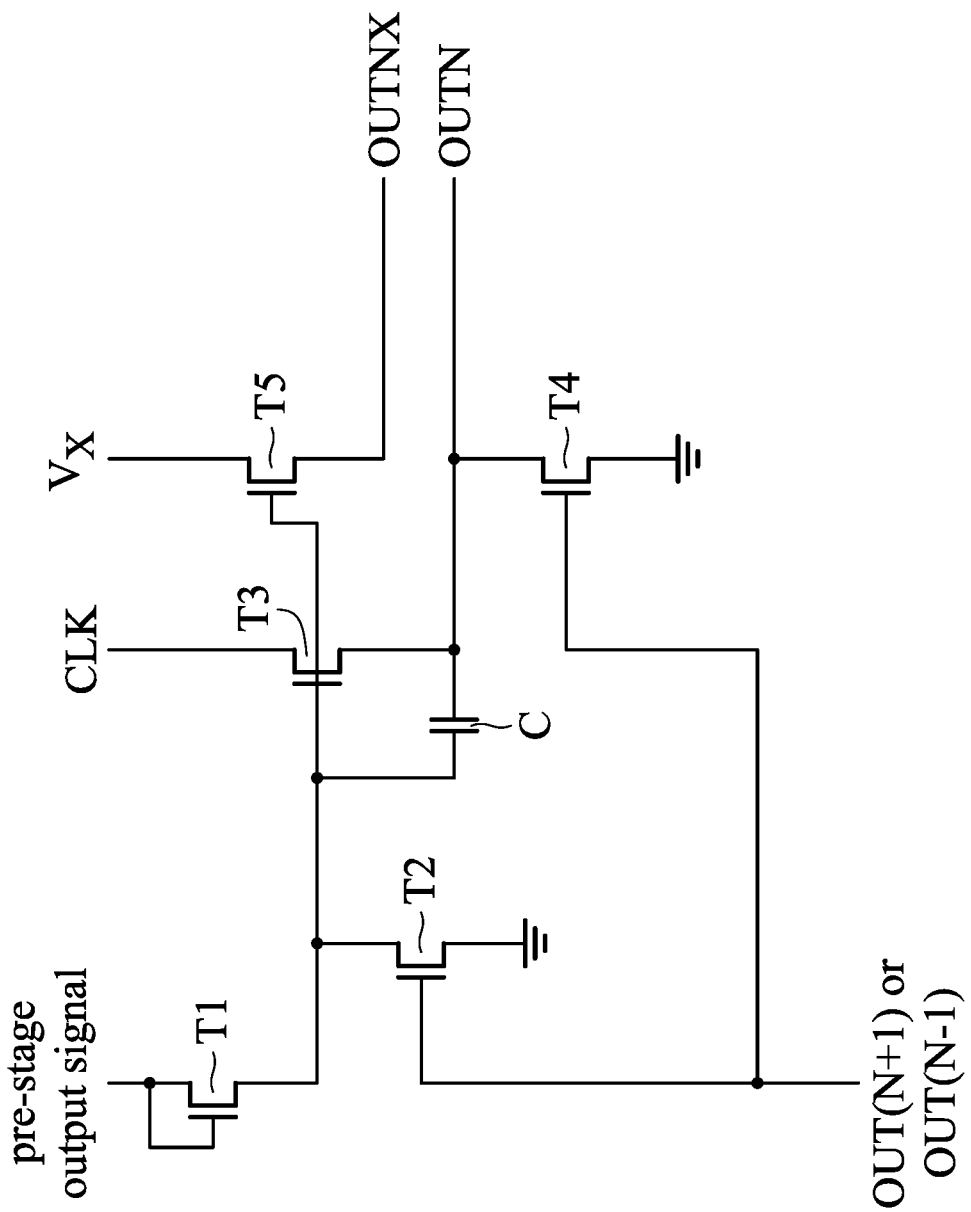
FIG. 10 is a diagram of a shift register in the gate driving circuit according to another embodiment of the present invention.

FIG. 10 is a diagram illustrating a shift register in the gate driving circuit according to another embodiment of the present invention. The shift register comprises a plurality of transistors and a capacitor. The first transistor T1 corresponds to the pull-up control circuit 81 in FIG. 8A and FIG. 8B, the second transistor T2 and the fourth transistor T4 correspond to the pull-down circuit 83 in FIG. 8A and FIG. 8B. The third transistor T3 corresponds to the pull-up output circuit 82 in FIG. 8A and FIG. 8B, and the fifth transistor T5 corresponds to the trigger circuit 84 in FIG. 8A and FIG. 8B.

The input terminal of the first transistor T1 is coupled to the gate terminal of the first transistor T1, so as to receive the second output signal OUT(N−1)X or OUT(N+1)X of the pre-stage shift register during the touch sensing period. The second transistor T2 includes an input terminal coupled to the output terminal of the first transistor T1. A gate terminal of the second transistor T2 receives the first output signal OUT(N+1) or OUT(N−1) of the next-stage shift register, and an output terminal of the second transistor T2 is connected to the ground or a relatively low voltage level. The third transistor T3 includes an input terminal for receiving the clock signal CLK. A gate terminal of the third transistor T3 is coupled to the output terminal of the first transistor T1. An output terminal of the third transistor T3 outputs the first output signal OUTN of the shift register. The fourth transistor T4 includes an input terminal coupled to the output terminal of the third transistor T3. A gate terminal of the fourth transistor T4 receives the first output signal OUT(N+1) or OUT(N−1) of the next-stage shift register. An output terminal of the fourth transistor T4 is connected to the ground or the relatively low voltage level. A capacitor C includes a first terminal coupled to the output terminal of the first transistor T1 and a second terminal coupled to the output terminal of the third transistor T3. The fifth transistor T5 includes an input terminal for receiving the touch sensing signal Vx. A gate terminal of the fifth transistor T5 is coupled to the output terminal of the first transistor T1. An output terminal of the fifth transistor T5 outputs the second output signal OUTNX of the shift register.

In a general situation (in the display period), the touch sensing signal Vx is at the low voltage level. At this time, the shift register levels up the voltage levels of the control signal to the pre-stage shift register and the next-stage shift register by the first output signal OUTN. At this time, the voltage level of the output signal OUTN is determined by the clock signal CLK. During the touch sensing period, the shift register (the Nth shift register) accepting the clock signal adjacent to and after the touch sensing period pulls up the voltage level of the control signal to the pre-stage shift register (the (N−1)th shift register) by the second output signal OUTNX. The shift register (the (N−1)th shift register) accepting the clock signal adjacent to and before the touch sensing period levels up the voltage level of the control signal to the next-stage shift register (the Nth shift register) by the second output signal OUT(N−1)X. At this time, the voltage level of the output signal OUTNX or OUT(N−1)X is determined by the touch sensing signal Vx.

In this embodiment, the trigger signal generating circuit 51 in FIG. 5 can be applied to the shift register as shown in FIG. 10. The trigger signal output from the trigger signal generating circuit 51 is for determining the voltage level of the output signal OUTNX of the shift register.

As for the shift register accepting the clock signal adjacent to and before the touch sensing period (such as the (N−1)th shift register) in this embodiment; the connections of those transistors are similar to the shift register accepting the clock signal adjacent to and after the touch sensing period (such as the Nth shift register). The difference between the two shift registers is that the input terminal of the first transistor T1 of the shift register accepting the clock signal adjacent to and after the touch sensing period (such as the Nth shift register) receives the second output signal OUT(N−1)X of the pre-stage shift register when in the forward scan, and the input terminal of the first transistor T1 of the shift register accepting the clock signal adjacent to and before the touch sensing period (such as the (N−1)th shift register) receives the second output signal OUTNX of the Nth shift register.

Figure 11:
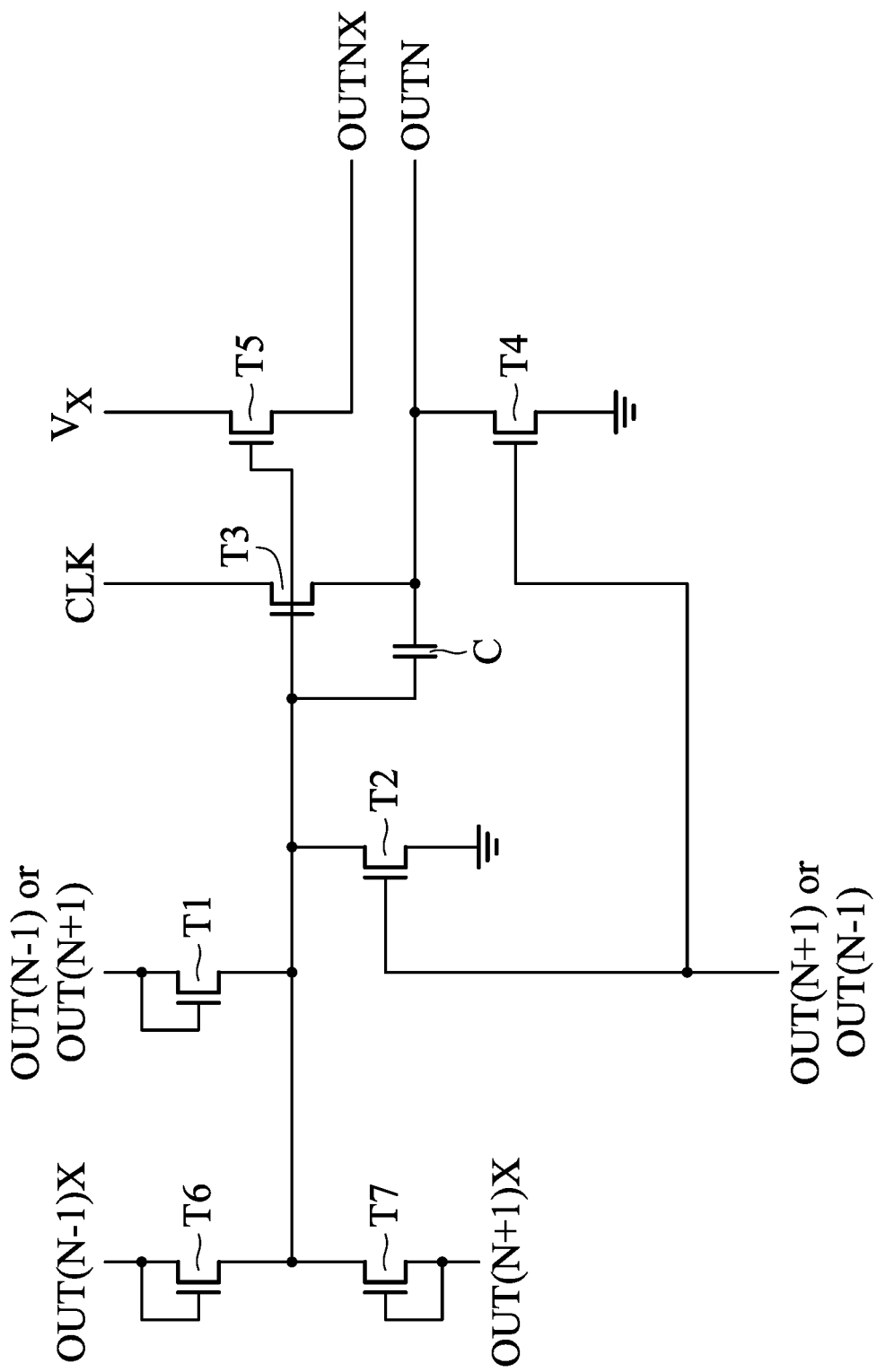
FIG. 11 is a diagram of a shift register in the gate driving circuit according to another embodiment of the present invention.

FIG. 11 is a diagram illustrating a shift register in the gate driving circuit according to another embodiment of the present invention. The shift register comprises a plurality of transistors and a capacitor. The first transistor T1 corresponds to the pull-up control circuit 81 in FIG. 8A and FIG. 8B. The second transistor T2 and the fourth transistor T4 correspond to the pull-down circuit 83 in FIG. 8A and FIG. 8B. The third transistor T3 corresponds to the pull-up output circuit 82 in FIG. 8A and FIG. 8B, and the fifth transistor T5, the sixth transistor T6 and a seventh transistor T7 correspond to the trigger circuit 84 in FIG. 8A and FIG. 8B.

The input terminal of the first transistor T1 is coupled to the gate terminal of the first transistor T1, so as to receive the first output signal OUT(N−1) or OUT(N+1) of the pre-stage shift register. The second transistor T2 includes an input terminal coupled to the output terminal of the first transistor T1. A gate terminal of the second transistor T2 receives the first output signal OUT(N+1) or OUT(N−1) of the next-stage shift register, and an output terminal of the second transistor T2 is connected to the ground or a relatively low voltage level. The third transistor T3 includes an input terminal for receiving the clock signal CLK. A gate terminal of the third transistor T3 is coupled to the output terminal of the first transistor T1. An output terminal of the third transistor T3 outputs the first output signal OUTN of the shift register. The fourth transistor T4 includes an input terminal coupled to the output terminal of the third transistor T3. A gate terminal of the fourth transistor T4 receives the output signal OUT(N+1) or OUT(N−1) of the next-stage shift register. An output terminal of the fourth transistor T4 is connected to the ground or the relatively low voltage level. A capacitor C includes a first terminal coupled to the output terminal of the first transistor T1 and a second terminal coupled to the output terminal of the third transistor T3. The fifth transistor T5 includes an input terminal for receiving the touch sensing signal Vx. A gate terminal of the fifth transistor T5 is coupled to the output terminal of the first transistor T1. An output terminal of the fifth transistor T5 outputs the second output signal OUTNX of the shift register. The sixth transistor T6 includes an input terminal coupled to a gate terminal of the sixth transistor T6 for receiving a second output signal OUT(N−Y)X of the (N−Y)th shift register. An output terminal of the sixth transistor T6 is coupled to the output terminal of the first transistor T1. The seventh transistor T7 includes an input terminal coupled to a gate terminal of the seventh transistor T7 for receiving a second output signal OUT(N+Y)X of the (N+Y)th shift register. An output terminal of the seventh transistor T7 is coupled to the output terminal of the first transistor T1. In this embodiment, only one of the sixth transistor T6 and the seventh transistor T7 is turned on at a time point.

In a general situation (i.e. in the display period), the touch sensing signal Vx is at the low voltage level. At this time, the shift register levels up the voltage levels of the control signals to the pre-stage shift register and the next-stage shift register by the first output signal OUTN. At this time, the voltage level of the first output signal OUTN is determined by the clock signal CLK. During the touch sensing period, the voltage level of the control signals to the pre-stage shift register and the next-stage shift register are leveled up by the second output signal OUTNX. At this time, the voltage level of the second output signal OUTNX is determined by the touch sensing signal Vx.

In this embodiment, the trigger signal generating circuit 51 in FIG. 5 can be applied to the shift register as shown in FIG. 11. The trigger signal output from the trigger signal generating circuit 51 is for determining the voltage level of the output signal OUTNX of the shift register.

As for the shift register accepting the clock signal adjacent to and before the touch sensing period (such as the (N−1)th shift register) in this embodiment; connections of those transistors are similar to the shift register accepting the clock signal adjacent to and after the touch sensing period (such as the Nth shift register). The difference between the two shift registers is that the input terminal of the sixth transistor T6 of the shift register accepting the clock signal adjacent to and before the touch sensing period (such as the (N−1)th shift register) receives the second output signal of the pre-stage shift register corresponding to the (N−1)th shift register when in the forward scan. That is, the second output signal OUT(N−2Y)X is outputted from the trigger circuit of the (N−2Y)th shift register. The input terminal of the seventh transistor T7 of the shift register accepting the clock signal adjacent to and before the touch sensing period (such as the (N−1)th shift register) receives the second output signal OUTNX of the next-stage shift register (such as the Nth shift register).

What should be described additionally is that the touch sensing period can be randomly inserted between two display periods. For example, the number of shift registers accepting the clock signal adjacent to and before the touch sensing period is equal to the number of shift registers accepting the clock signal adjacent to and after the touch sensing period in a previous configuration. That is, the touch sensing is performed after 36 stages of shift registers (such as the 36th shift register), and then the touch sensing is performed again after one more round of 36 stages of shift registers (such as the 72nd stage). Therefore, the touch sensing period is between the 36th clock signal accepted by the 36th shift register and the 37th clock signal accepted by the 37th shift register, between the 72nd clock signal accepted by the 72nd stage shift register and the 73rd clock signal accepted by the 73rd stage shift register, between the 108th clock signal accepted by the 108th shift register and the 109th clock signal accepted by the 109th shift register, and so on. In this embodiment, because of the sixth transistor T6 and the seventh transistor T7, the touch sensing function does not have to be limited to a fixed interval.

Figure 12:
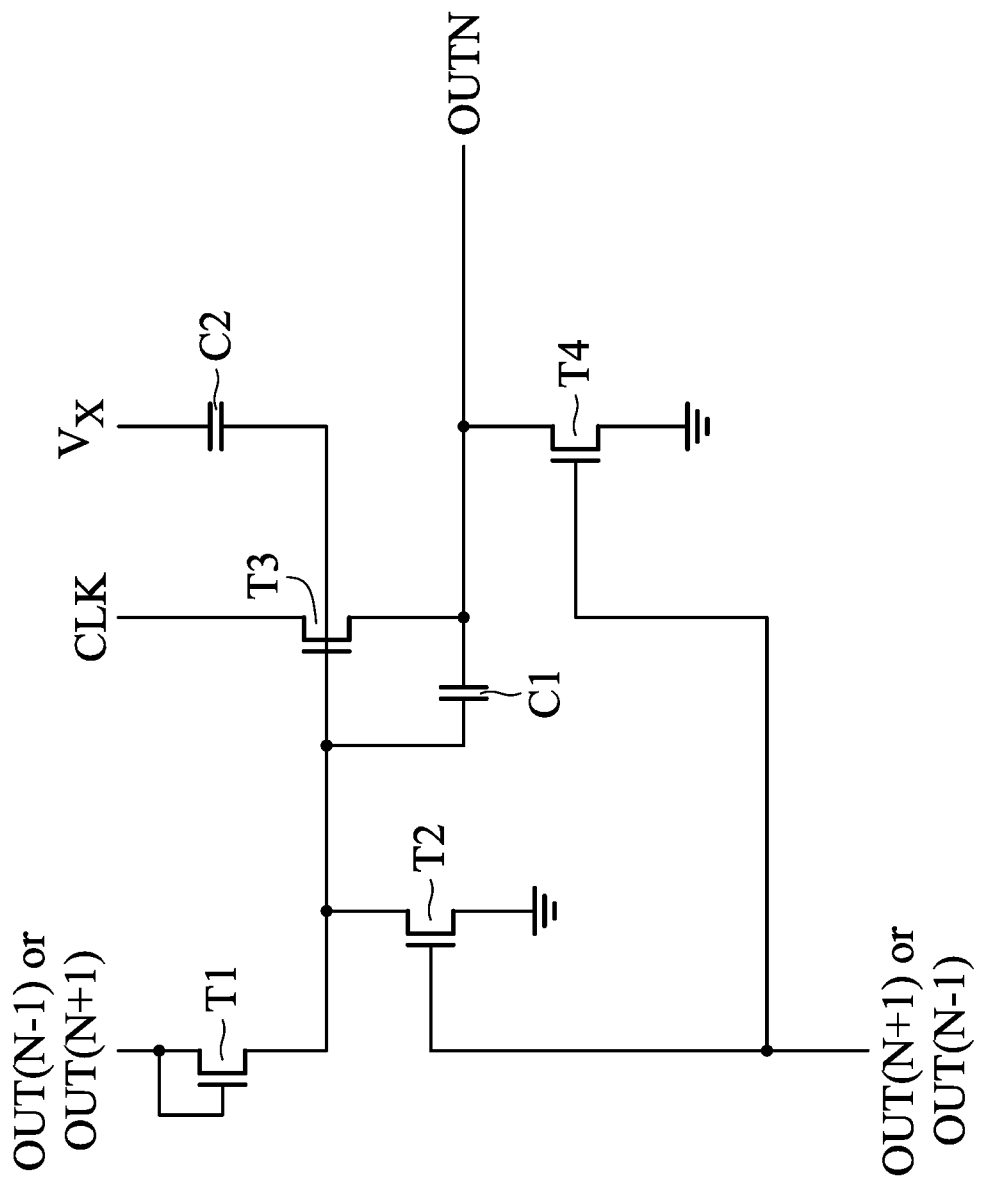
FIG. 12 is a diagram of a shift register in the gate driving circuit according to another embodiment of the present invention.

FIG. 12 is a diagram illustrating a shift register in the gate driving circuit according to another embodiment of the present invention. The shift register comprises a plurality of transistors and capacities. The first transistor T1 corresponds to the pull-up control circuit 81 in FIG. 8A and FIG. 8B. The second transistor T2 and the fourth transistor T4 correspond to the pull-down circuit 83 in FIG. 8A and FIG. 8B. The third transistor T3 corresponds to the pull-up output circuit 82 in FIG. 8A and FIG. 8B, and a second capacitor corresponds to the trigger circuit 84 in FIG. 8A and FIG. 8B.

The input terminal of the first transistor T1 is coupled to the gate terminal of the first transistor T1, so as to receive the first output signal OUT(N−1) or OUT(N+1) of the pre-stage shift register. The second transistor T2 includes an input terminal coupled to the output terminal of the first transistor T1. A gate terminal of the second transistor T2 receives the first output signal OUT(N+1) or OUT(N−1) of the next-stage shift register, and an output terminal of the second transistor T2 is connected to the ground or a relatively low voltage level. The third transistor T3 includes an input terminal for receiving the clock signal CLK. A gate terminal of the third transistor T3 is coupled to the output terminal of the first transistor T1. An output terminal of the third transistor T3 outputs the first output signal OUTN of the shift register. The fourth transistor T4 includes an input terminal coupled to the output terminal of the third transistor T3. A gate terminal of the fourth transistor T4 receives the first output signal OUT(N+1) or OUT(N−1) of the next-stage shift register. An output terminal of the fourth transistor T4 is connected to the ground or the relatively low voltage level. A first capacitor C1 includes a first terminal coupled to the output terminal of the first transistor T1 and a second terminal coupled to the output terminal of the third transistor T3. A second capacitor C2 includes a first terminal for receiving the touch sensing signal Vx and a second terminal coupled to the gate terminal of the third transistor T3.

In this embodiment, when the touch sensing signal Vx changes from the low voltage level to the high voltage level, the capacitor coupling effect can be utilized to provide the first output signal OUTN with a pulse signal, like the first touch sensing signal Vx1 in FIG. 7C, so as to improve the falling time of the pre-stage shift register.

In this embodiment, the trigger signal generating circuit 51 in FIG. 5 can be applied to the shift register in FIG. 12, and a trigger signal (touch sensing signal Vx) generated by the trigger signal generating circuit 51 or the first touch sensing signal Vx1 is applied to the second capacitor C2, so as to improve the falling time of the pre-stage shift register.

In one embodiment of the present invention, the circuit in FIG. 12 can also be applied to a panel without touch function. As for the Nth shift register in the panel without touch function; the trigger circuit 84 is coupled to the pull-up output circuit 82 and the pull-up control circuit 81. The pull-up output circuit 82 receives the first clock signal CLK1, and the trigger circuit 84 receives a third clock signal CLK3 (not shown in figures) which is later than the first clock signal CLK1.

In one embodiment of the present invention, the in-cell touch panel includes a gate driving circuit and a pixel array. The gate driving circuit comprises a plurality of shift registers, and the detailed circuit of each shift register is shown in FIG. 9 to FIG. 12.

In another embodiment of the present invention, a non-in-cell touch panel includes a gate driving circuit to drive a pixel array. The gate driving circuit comprises a plurality of shift registers, and the detailed circuit of each shift register is shown in FIG. 9, FIG. 11 to FIG. 12.

In one embodiment of the present invention, the in-cell touch panel includes a gate driving circuit to drive a pixel array. The gate driving circuit comprises a plurality of shift registers. The plurality of shift registers includes a pre-stage shift register and an Nth shift register, a first clock signal is provided to the Nth shift register and is maintained at a the high logic level in a first time interval, a second clock signal is provided to the pre-stage shift register and is maintained at a high logic level in a second time interval. The touch sensing period corresponds to a period between the first time interval and the second time interval. Therefore, the (N−1)th shift register and the Nth shift registers can be implemented by the shift registers shown in FIG. 9 to FIG. 12.

In one embodiment of the present invention, the in-cell touch panel includes a gate driving circuit to drive a pixel array. The gate driving circuit comprises a plurality of gate driving units. An output signal of each gate driving unit is transmitted to a next stage gate driving unit, so as to enable the next gate driving unit. The output signal of each gate driving unit is transmitted to a pre-stage gate driving unit, so as to pull up a control signal of the pre-stage gate driving unit. The gate driving unit includes a shift register and a trigger circuit. An embodiment of the shift register is implemented by the pull-up control circuit 81, the pull-up output circuit 82 and pull-down circuit 83 in FIG. 8A and FIG. 8B. An embodiment of the trigger circuit is implemented by the trigger circuit 84 in FIG. 8A and FIG. 8B. During the display period as shown in FIG. 2, the output signal of the gate driving unit is determined by the shift register. During the touch sensing period as shown in FIG. 2, the trigger circuit receives a touch sensing signal, the output signal of the gate driving unit is determined by the trigger circuit. In this disclosure, the gate driving unit can also be implemented by the circuit in FIGS. 9, 11 and 12.

Figure 13:
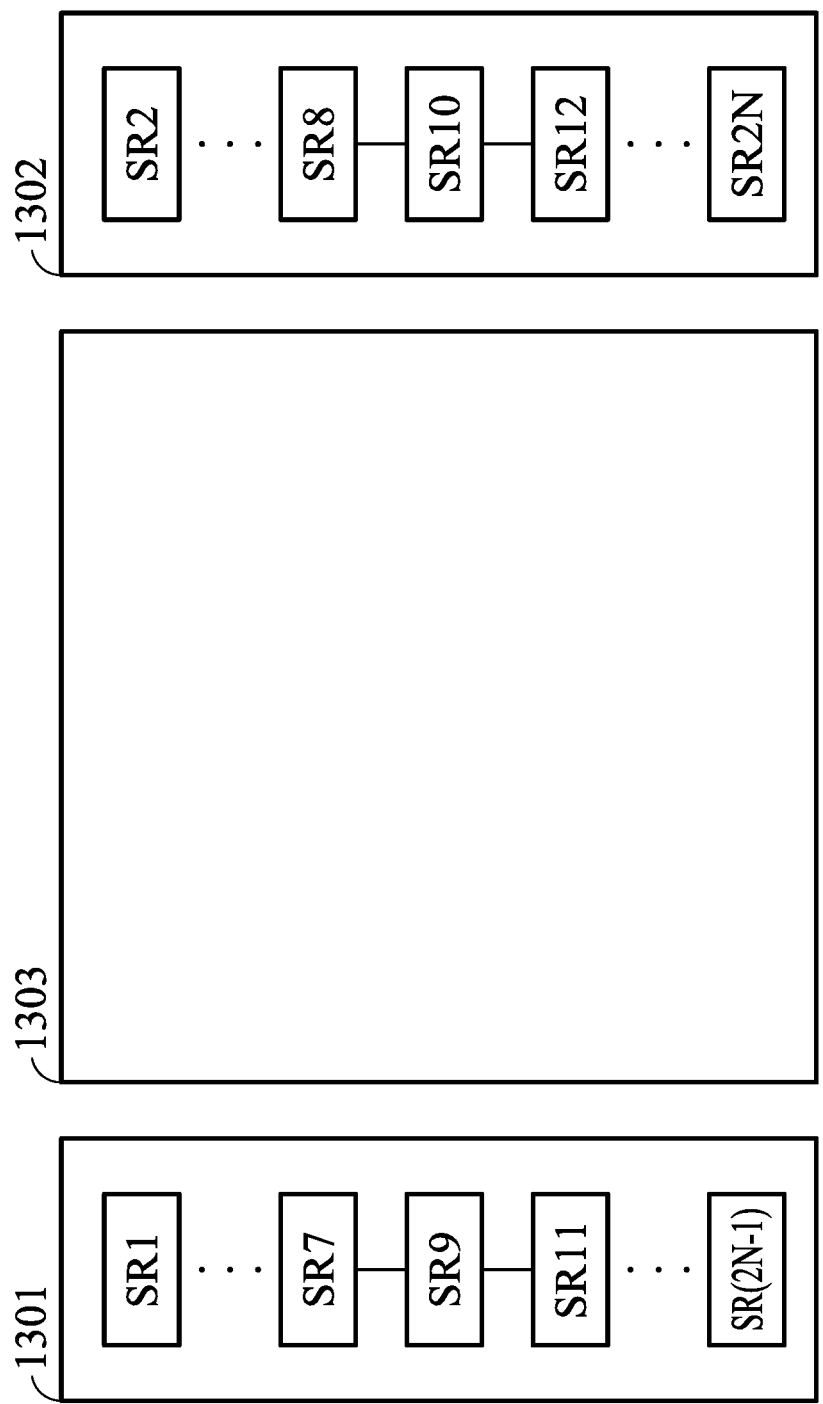
FIG. 13 is a diagram of an in-cell touch panel according to another embodiment of the present invention.

FIG. 13 is a diagram of an in-cell touch panel according to another embodiment of the present invention. In FIG. 13, only parts of components are used for description and do not limit this invention. In FIG. 13, the in-cell touch panel includes a first gate driving circuit 1301 and a second gate driving circuit 1302 to drive a pixel array 1303. The first gate driving circuit 1301 includes a plurality of shift registers denoted by odd numbers, and the second gate driving circuit 1302 includes a plurality of shift registers denoted by even numbers.

In FIG. 13, if the touch sensing period is placed at period between a clock signal accepted by a pre-stage shift register SR9 and a clock signal accepted by a next stage shift register SR11, the output signals of the shift register SR9 and SR11 can be adjusted by the method described before, so as to achieve the purpose of the invention. Similarly, regarding registers SR8, SR10 and/or SR12 of the second gate driving circuit 1302: the output signal of the shift register or the clock signals received by the shift register need to be adjusted by the method described before, so as to achieve the purpose of the invention.

Although embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A gate driving circuit, for driving a pixel array, the gate driving circuit comprising a plurality of shift registers, the plurality of shift registers comprising a pre-stage shift register and an $N^{th}$ shift register, a first clock signal provided to the $N^{th}$ shift register and maintained at a high logic level in a first time interval, a second clock signal provided to the pre-stage shift register and maintained at a high logic level in a second time interval, wherein a frame period of the gate driving circuit comprises a touch sensing period, the touch sensing period is adjacent to and after the second time interval, and the first time interval is greater than a length of the touch sensing period;

wherein a time point at which a logic level of the first clock signal rises is earlier than a time point at which a logic level of the second clock signal falls.

* * * * *